United States Patent [19]

Tsunei

[11] Patent Number: 5,379,078
[45] Date of Patent: Jan. 3, 1995

[54] TRAP CIRCUIT APPARATUS FOR TELEVISION RECEIVER

[75] Inventor: Masafumi Tsunei, Osaka, Japan

[73] Assignee: Matsushita Electric Industrial Co., Ltd., Osaka, Japan

[21] Appl. No.: 824,625

[22] Filed: Jan. 29, 1992

[30] Foreign Application Priority Data

Jan. 29, 1991 [JP] Japan ............ 3-8879

[51] Int. Cl.$^6$ ............ H04N 5/44
[52] U.S. Cl. ............ 348/725; 348/736
[58] Field of Search ............ 358/167, 188, 196, 191.1, 358/86; 455/307, 295, 296, 286, 191.1, 195.1, 166.1; H04N 5/50, 5/44; 333/175; 348/554, 563, 725, 726, 727, 728, 729, 731, 732, 733, 736, 735

[56] References Cited

U.S. PATENT DOCUMENTS

| | | | |
|---|---|---|---|
| 3,562,417 | 2/1971 | Poppa | 358/196 |
| 4,263,619 | 4/1981 | Theriault | 358/196 |
| 4,287,602 | 9/1981 | Kessler | 455/307 |
| 4,361,909 | 11/1982 | Theriault | 358/196 |
| 4,395,735 | 7/1983 | Holmes | 348/736 |
| 4,642,691 | 2/1987 | Sakarya | 348/736 |
| 4,660,087 | 4/1987 | Rumreich | 348/736 |
| 4,771,332 | 9/1988 | Metoki | 358/191.1 |
| 4,807,036 | 2/1989 | Osada | 358/196 |
| 4,956,710 | 11/1990 | Pugel | 358/188 |
| 5,126,848 | 6/1992 | Sim | 358/196 |
| 5,142,369 | 8/1992 | Grubbs et al. | 358/196 |
| 5,142,370 | 8/1992 | Wignot et al. | 358/196 |
| 5,142,371 | 8/1992 | Lehman | 358/196 |

FOREIGN PATENT DOCUMENTS

| | | | |
|---|---|---|---|
| 104389 | 6/1982 | Japan | 358/196 |
| 60-30626 | 3/1985 | Japan . | |
| 60-80325 | 5/1985 | Japan . | |
| 258577 | 11/1986 | Japan | H04N 5/44 |
| 63-144769 | 9/1988 | Japan . | |
| 194772 | 8/1989 | Japan | H04N 5/46 |
| 2-14686 | 1/1990 | Japan . | |
| 2-256325 | 10/1990 | Japan . | |
| 152775 | 5/1992 | Japan | H04N 5/44 |

*Primary Examiner*—James J. Groody
*Assistant Examiner*—Chris Grant
*Attorney, Agent, or Firm*—Lowe, Price, LeBlanc & Becker

[57] ABSTRACT

A trap circuit apparatus for a television receiver comprising: a first trap circuit for producing a first trapped video signal by reducing a component level of a sound detection signal included in and accompanied with a video detection signal from a tuner of the television receiver, frequencies of the video detection signal and the sound detection signal having a given relation therebetween; and a second trap circuit responsive to the first trapped video signal for producing a second trapped video signal by reducing a component level of a radio detection signal included in the video detection signal, frequencies of the video detection signal and the radio detection signal having a second given relation therebetween. This trap circuit apparatus prevents FM interference radio wave signal in addition to a sound signal accompanied with video detection signal from entering a video processing circuit, etc. In U.S.A., radio waves of FM broadcasting stations of channels CH 201 (carrier frequency: 88.1 MHz) to CH 220 (carrier frequency: 91.9 MHz) are assigned to a frequency band where a television radio wave of CH 6 (video carrier frequency: 83.25 MHz) is assigned, at a frequency interval of 200 KHz.

10 Claims, 4 Drawing Sheets

TRAP CIRCUIT APPARATUS FOR TELEVISION RECEIVER

BACKGROUND OF THE INVENTION

1. Field of the Invention

This invention relates to a television receiver and particularly to a television receiver having a trap circuit for reducing radio interference between television and FM radio waves.

2. Description of the Prior Art

In U.S.A., radio waves of FM broadcasting stations of channels CH 201 (carrier frequency: 88.1 MHz) to CH 220 (carrier frequency: 91.9 MHz) are assigned at frequency intervals of 200 KHz to a frequency band where a television radio wave of CH 6 (video carrier frequency: 83.25 MHz) is assigned. Therefore, there is a problem of interference to television receivers developed by this overlapped assignment of frequency of these radio waves.

The FCC (Federal Communication Commission) recommend manufactures of television receivers and video tape recorders improvement in the interference on the side of the television receivers or video tape recorders because the FCC intends to support development of FM broadcasting.

Moreover, the FCC intended the manufacturers to make it the manufacturer's duty to execute FM interference countermeasure by a law to keep a sufficient improvement in this interference.

Countermeasure of such interference has been tried. For example, Japanese patent application provisional publication No. 60-80325 discloses a technique of reducing affection due to the Interference of FM radio waves by providing a trap circuit for removing frequency component of the FM radio wave at an input antenna terminal of a tuner of a television.

However, in such prior art, if attenuation is increased, there is problem that a trap having a high accuracy of frequency is required. Further, increase in attenuation causes a problem of leaking. Therefore, a sufficient attenuation of interference components has not been obtained.

Hereinbelow will be described a prior art video detection circuit and a video amplifying circuit following the video detection circuit with reference to FIGS. 4 and 5.

FIG. 4 is a block diagram of a prior art trap circuit 3 followed by a video detection circuit. In FIG. 4, the trap circuit 3 following a video detection circuit 1 and a video signal amplifying circuit 2 comprises a matching resistor R1, a variable coil L1 for determining trapping band width, and a trap X1 of 4.5 MHz (a ceramic trap). Its output signal is supplied to a video signal processing, color signal processing, and synchronizing signal separation circuits of the following stage.

The trap circuit 3 of 4.5 MHz represents a frequency characteristic as shown in FIG. 5. FIG. 5 shows a frequency characteristic of the prior art trap circuit shown in FIG. 4. The trap circuit 8 prevents a sound signal of 4.5 MHz from entering the following stage of the video signal processing, color signal processing, and synchronizing separation circuits as shown in FIG. 5. As shown in FIG. 5, the FM radio waves CH 201 is detected at 4.85 MHz; and the FM radio waves CH 202 is detected at 5.05 MHz when the channel CH 8 is selected. Therefore, a detection level of interference components cannot be attenuated sufficiently by the trap circuit 3 shown in FIG. 4 as mentioned above. Therefore, a beat is developed between the color signal carrier frequency 3.58 MHz and these interference components. Accordingly, beat signals of 1.27 MHz and 1.47 MHz are developed, so that a strip pattern noise due to the interference appears in the reproduced video image.

FIG. 6 shows this relation more specifically. FIG. 6 is a chart showing frequency relation of the channel CH 6 of television radio wave and FM radio waves. As shown in FIG. 6, beat signals of 1.27 MHz, 1.47 MHz, 1.67 MHz, . . . , 3.27 MHZ are developed between the detection signal frequency components and the color carrier frequency of 3.58 MHz.

SUMMARY OF THE INVENTION

The present invention has been developed in order to remove the above-described drawbacks inherent to the conventional trap circuit apparatus for a television receiver.

According to the present invention there is provided a first trap circuit apparatus for a television receiver comprising: a first trap circuit for producing a first trapped video signal by reducing a component level of a sound detection signal included in and accompanied with a video detection signal from a tuner of the television receiver, frequencies of the video detection signal and the sound detection signal having a given relation therebetween; and a second trap circuit responsive to the first trapped video signal for producing a second trapped video signal by reducing a component level of a radio detection signal included in the video detection signal, frequencies of the video detection signal and the radio detection signal having a second given relation therebetween. This trap circuit apparatus prevents FM interference radio wave signal in addition to a sound signal accompanied with video detection signal from entering a video processing circuit, etc.

According to the present invention there is also provided a second trap circuit apparatus for a television receiver as mentioned in the first trap circuit, wherein the first trap circuit reduces the component level of the sound detection signal of 4.5 MHz.

According to the present invention there is further provided a third trap circuit apparatus for a television receiver as mentioned in the second trap circuit apparatus, wherein the second trap circuit reduces the level of a radio detection signal of 4.85 MHz.

According to the present invention there is also provided a fourth trap circuit apparatus for a television receiver as mentioned in the third trap circuit apparatus, further comprising a third trap circuit for reduces a level of a frequency component of 5.05 MHz.

According to the present invention there is also provided a fifth trap circuit apparatus for a television receiver comprising: a first trap circuit for producing a first trapped video signal by reducing a component level of a radio detection signal included in a video detection signal from a tuner of the television receiver, frequencies of the video detection signal and the radio detection signal having a first given relation therebetween; and a second trap circuit responsive to the first trapped video signal for producing a second trapped video signal by reducing a component level of a sound detection signal included in and accompanied with the video detection signal, frequencies of the video detection signal and the sound detection signal having a second given relation therebetween.

According to the present invention there is also provided a sixth trap circuit apparatus for a television receiver as mentioned in the fifth trap circuit apparatus, wherein the first trap circuit reduces the level of a radio detection signal of 4.85 MHz.

According to the present invention there is also provided a seventh trap circuit apparatus for a television receiver as mentioned in the sixth trap circuit apparatus, wherein the second trap circuit reduces the component level of the sound detection signal of 4.5 MHz.

According to the present invention there is also provided an eighth trap circuit apparatus for a television receiver as mentioned in the seventh trap circuit apparatus, further comprising a third trap circuit for reduces a level of a frequency component of 5.05 MHz.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Figure 3:
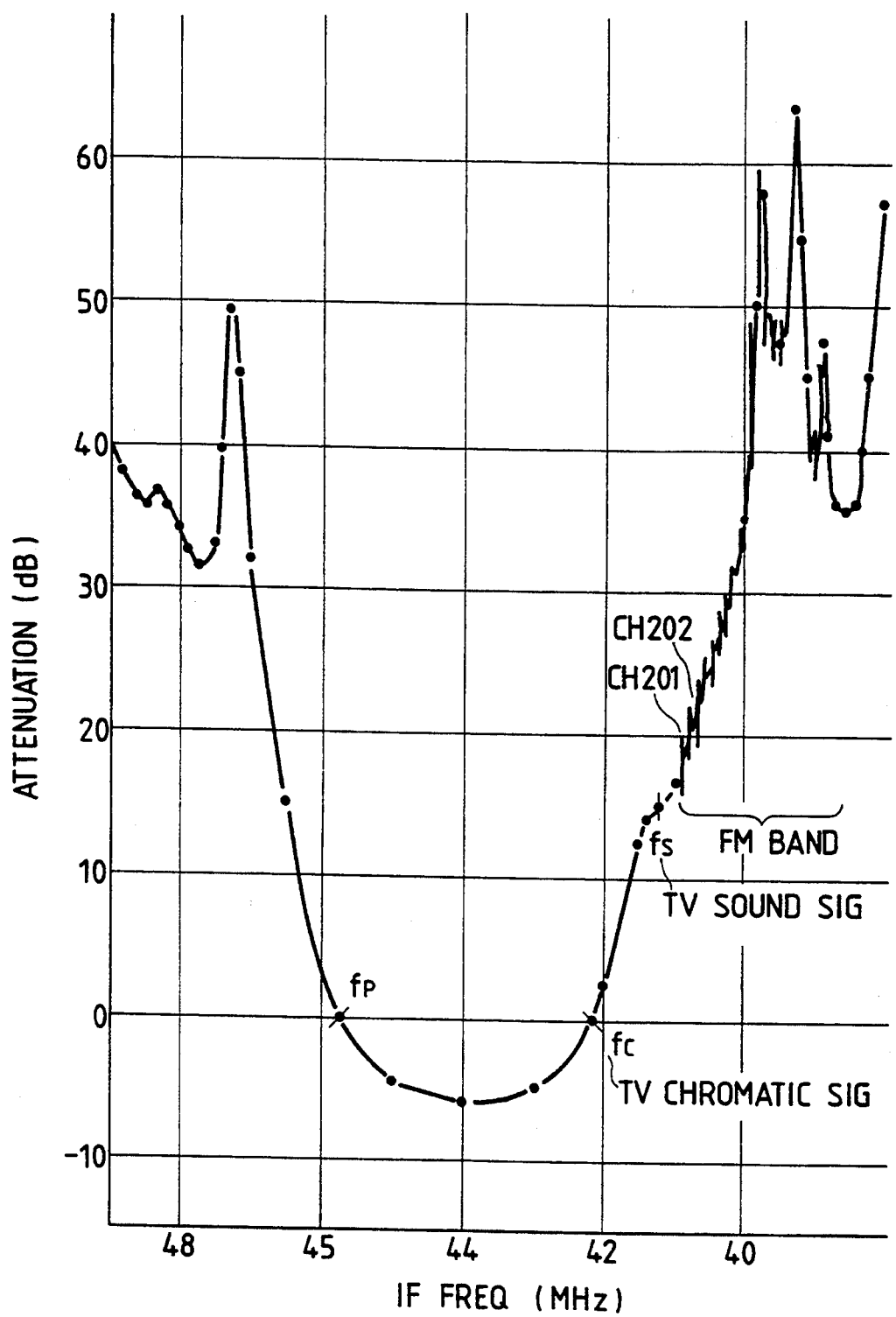
FIG. 3 shows a one-frequency-signal selection characteristic in the intermediate frequency amplifying circuit of this embodiment.
Figure 4:
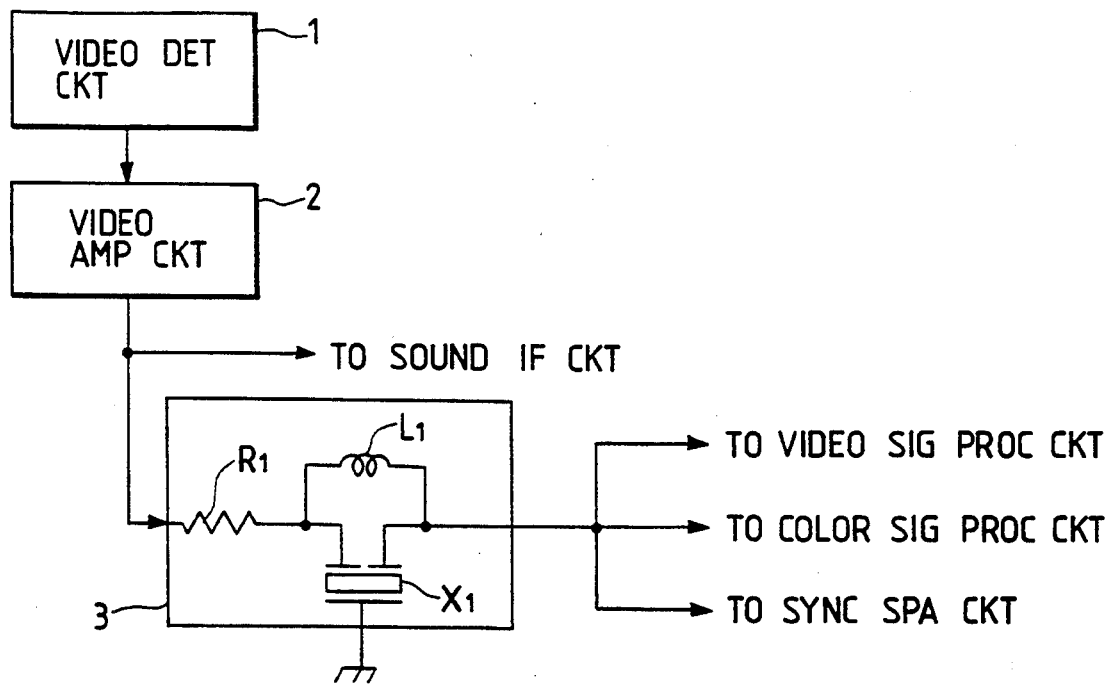
FIG. 4 is a block diagram of a prior art trap circuit.
Figure 5:
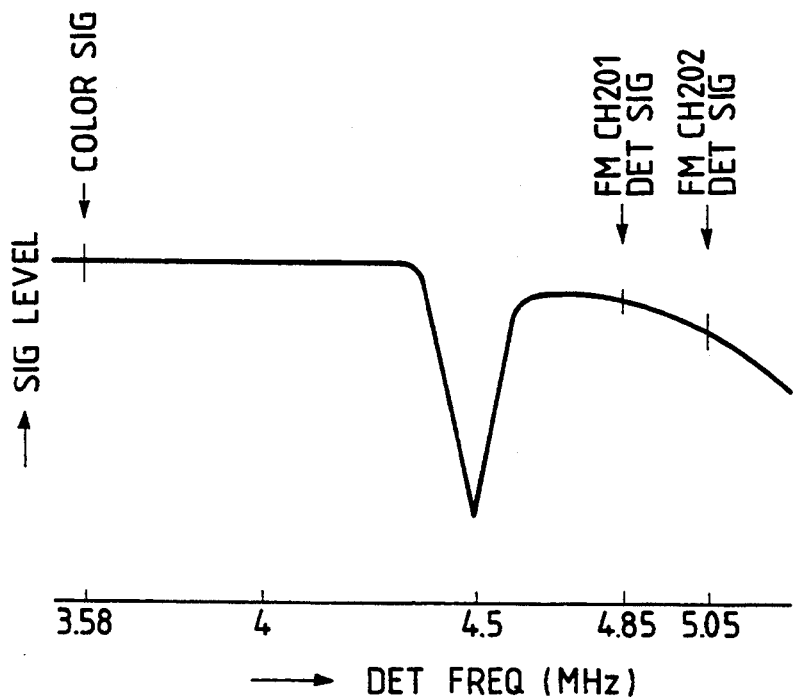
FIG. 5 shows a frequency characteristic of the prior art trap circuit shown in FIG. 4.
Figure 6:
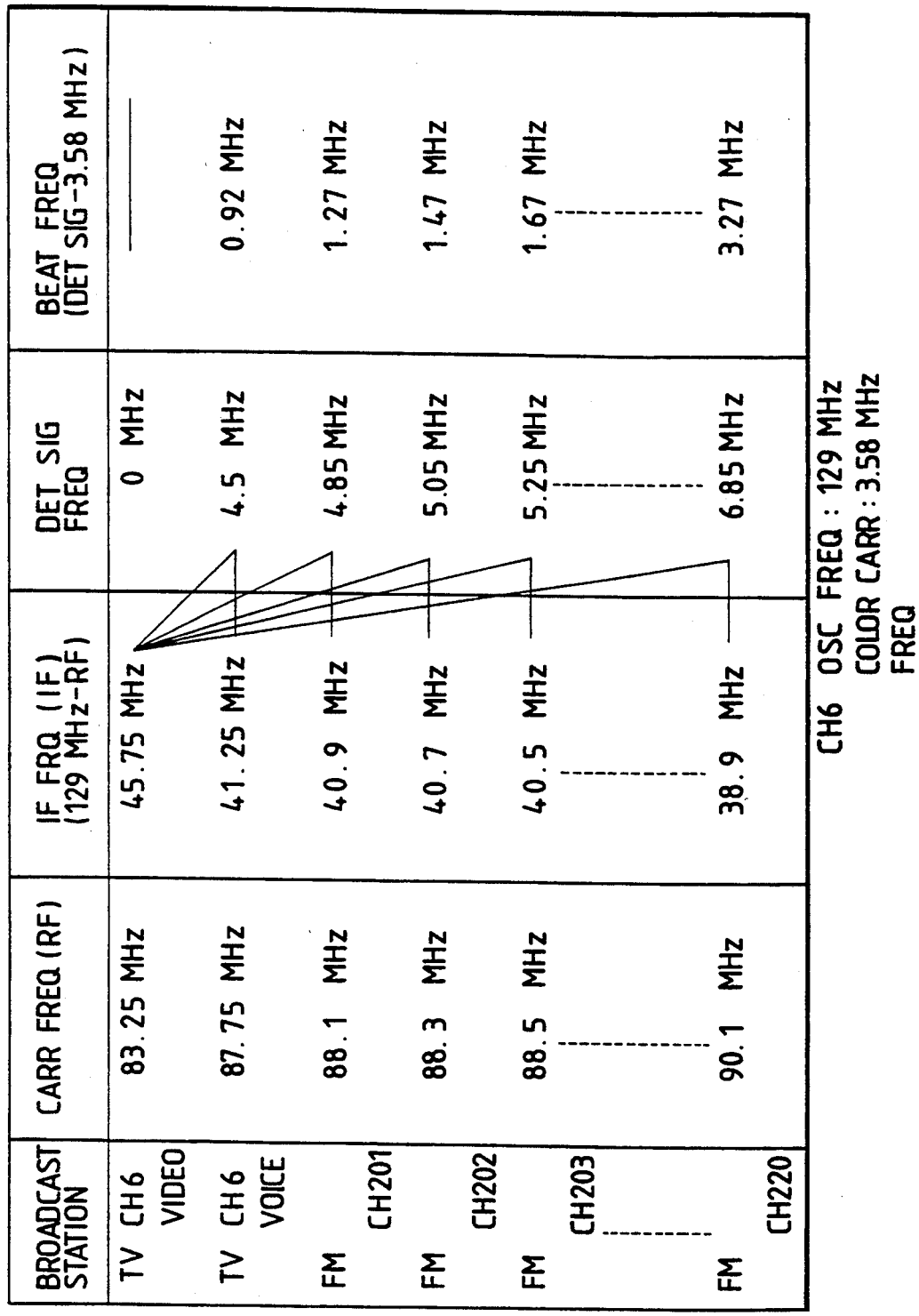
FIG. 6 is a chart of a prior art showing frequency relation of the channel CH 6 of television radio wave and FM radio waves.

Prior to description of an embodiment of this invention, radio interference between the channel CH 6 and each of broadcasting radio waves will be described more concretely. As shown in FIG. 6 showing frequency relation of the channel CH 6 of television radio wave and FM radio waves, beat signals of 1.27 MHz, 1.47 MHz, 1.67 MHz, . . . , 3.27 MHZ are developed between the detection signal frequency components and the color carrier frequency of 3.58 MHz. These beat signals adversely affect the reproduced image as a strip pattern of noise. FIG. 3 shows a one-frequency-signal selection characteristic in the intermediate frequency amplifying circuit 10 (shown in FIG. 1) which adopts an intercarrier system.

In FIG. 3, the FM radio waves whose frequencies are higher than that of the channel CH 203 are not problem substantially because such affection due to these radio waves can be reduced by using a tuner and a surface wave filter (SAW). Therefore, in this embodiment, reduction of interference due to the radio waves of the channel CH 201 and CH 202 is carried out.

Figure 1:
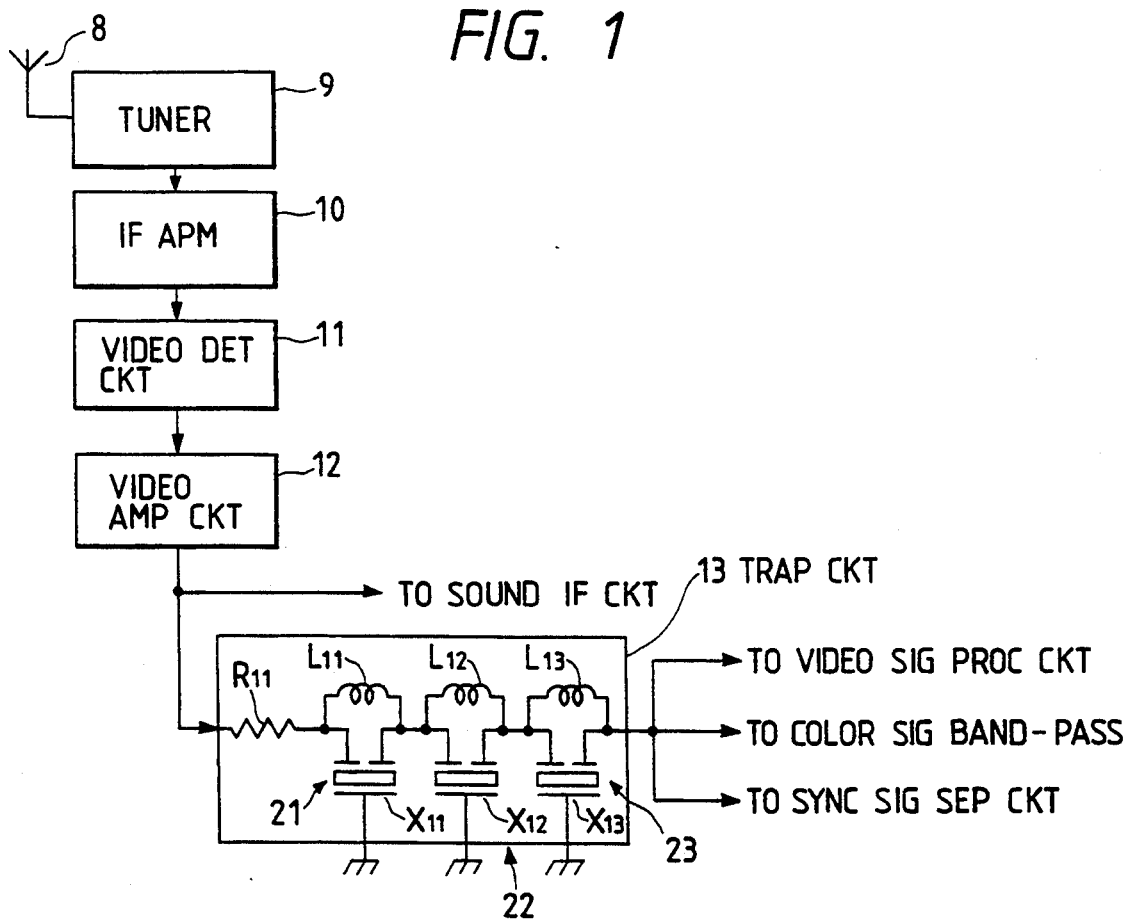
FIG. 1 is a block diagram of an embodiment of a trap circuit apparatus of the invention.

Hereinbelow will be described the embodiment of this invention with reference to drawings. FIG. 1 is a block diagram of this embodiment of a trap circuit apparatus of the invention.

In FIG. 1, a tuner 9 receives a television signal through an antenna 8 and produces a tuned signal. A video detection circuit 11 detects a video detection signal from the tuned signal. The video detection signal includes a sound signal accompanied with a video detection signal of the desired frequency and the FM interference components as mentioned above. A video amplifying circuit 12 amplifies the video detection signal. The amplified video detection signal from the video amplifying circuit 12 is sent to a trap circuit 13.

The trap circuit 13 comprises an impedance matching resistor R11, a first trap circuit 21 of 4.5 MHz for producing a first trapped video signal by reducing a frequency component of 4.5 MHz from an output of the video amplifying circuit 12 through the impedance matching resistor R11, a second trap circuit 22 of 4.85 MHz for producing a second trapped video signal by reducing a frequency component of 4.85 MHz from the first trap circuit 21, and a third trap circuit of 5.05 MHz for producing a third trap signal by reducing a frequency component of 5.05 MHz. Therefore the trap circuit 13 reduces frequency components of 4.5, 4.85, and 5.05 MHz. The first trap circuit 21 comprises a coil L11 for determining trap band width, connected in series to the impedance matching resistor R11 and a trap X11 whose first and second terminals are connected in parallel to the coil L11 and whose third terminal is connected to a ground potential. The second trap circuit 22 comprises a coil L12 for determining trap band width connected in series to the first trap circuit and a trap X12 whose first and second terminals are connected in parallel to the coil L12 and whose third terminal is connected to the ground potential. The third trap circuit 23 comprises a coil L13 for determining trap band width connected in series to the second trap circuit and a trap X13 whose first and second terminals are connected in parallel to the coil L13 and whose third terminal is connected to the ground potential. As mentioned above, the level of sound signal component of 4.5 MHz is reduced at first by the first trap circuit 21. However, it is also possible that the first trap circuit 21 reduces the interference component of 4.85 MHz by selecting values of the coil L11 and the trap X11 and the second trap circuit 22 reduces the sound signal component of 4.5 MHz by selecting values of the coil L12 and the trap X12.

Figure 2:
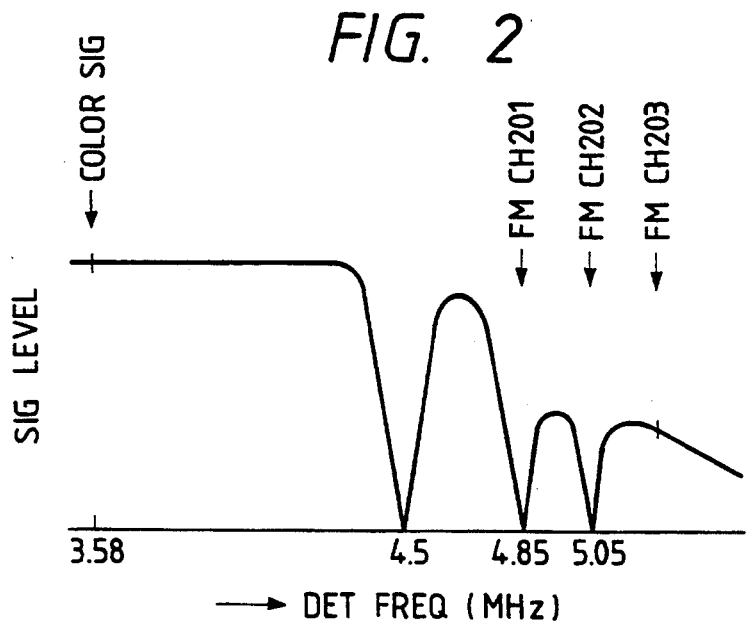
FIG. 2 shows a frequency characteristic of the trap circuit apparatus of this embodiment.

FIG. 2 shows a frequency characteristic of the trap circuit 13. In FIG. 2, frequency component levels of 4.5, 4.85, and 5.05 MHz are reduced, so that the strip pattern noise due to interference from FM radio waves of CH 201 and CH 202, displayed on the display screen can be reduced. On the other hand, this trap circuit 13 does not affect to a frequency band lower than 4.5 MHz for reproducing a video image.

What is claimed is:

1. In a television receiver apparatus including a tuner, an IF amplifier receiving a tuned signal from the tuner, a video detection circuit for detecting a video detection signal from the tuner and a video signal processing circuit, the improvement comprising:

a trap circuit for trapping a radio detection signal included in said video detection signal and a sound detection signal included in said video detection signal, said trap circuit connected between the video detection circuit and the video signal processing circuit, said trap circuit including:

a first trap circuit for producing a first trapped video signal by reducing an amplitude of a component level of a first signal, said first signal being one of either: said radio detection signal or said sound detection signal included in and accompanied with the video detection signal, wherein frequencies of the video detection signal and said first signal have a first predetermined relation therebetween; and a second trap circuit responsive to said first trapped video signal for producing a second trapped video signal by reducing an amplitude of a component level of a second signal, said second signal being the other signal of either: said radio detection signal or said sound detection signal included in and accompanied with the video detection signal, wherein frequencies of the video detection signal and said second signal have a second predetermined relation therebetween.

2. A television receiver apparatus as recited in claim 1, wherein said first signal is said radio detection signal and said second signal is said sound detection signal, and said first trap circuit comprises means for producing said first trapped video signal by reducing an amplitude of a component level of said radio detection signal and said second trap circuit comprises means for producing said second trapped video signal by reducing an amplitude of a component level of said sound detection signal.

3. A television receiver apparatus as recited in claim 2, wherein said first predetermined relation comprises a frequency difference of substantially 4.85 MHz and said first trap circuit reduces said amplitude of a component level of said radio detection signal of 4.85 MHz, and wherein said second predetermined relation comprises a frequency difference of substantially 4.5 MHz and said second trap circuit reduces said amplitude of a component level of said sound detection signal of 4.5 MHz.

4. A television receiver apparatus as recited in claim 3, further comprising a third trap circuit for reducing an amplitude of a second radio detection signal having a frequency component of 5.05 MHz, thereby simultaneously reducing from a display of the video detection signal noise stripes generated by said sound detection signal, said radio detection signal, and said second radio detection signal.

5. A television receiver apparatus as recited in claim 1, wherein said first signal is said sound detection signal and said second signal is said radio detection signal, and said first trap circuit comprises means for producing said first trapped video signal by reducing an amplitude of a component level of said sound detection signal and said second trap circuit comprises means for producing said second trapped video signal by reducing an amplitude of a component level of said radio detection signal.

6. A television receiver apparatus as recited in claim 5, wherein said first predetermined relation comprises a frequency difference of substantially 4.5 MHz and said first trap circuit reduces said amplitude of a component level of said sound detection signal of 4.5 MHz, and wherein said second predetermined relation comprises a frequency difference of substantially 4.85 MHz and said second trap circuit reduces said amplitude of a component level of said radio detection signal of 4.85 MHz.

7. A television receiver apparatus as recited in claim 6, further comprising a third trap circuit for reducing an amplitude of a second radio detection signal having a frequency component of 5.05 MHz, thereby simultaneously reducing from a display of the video detection signal noise stripes generated by said sound detection signal, said radio detection signal, and said second radio detection signal.

8. In a television receiver apparatus including a tuner, an IF amplifier receiving a tuned signal from the tuner, a video detection circuit for detecting a video detection signal from the tuner and a video signal processing circuit, the improvement comprising:

multiple stripe noise reducing means for simultaneously reducing a plurality of noise stripes from a detected video signal, said multiple stripe noise reducing means including:

trap circuit means connected between the video detection circuit and the video signal Processing circuit for trapping a radio detection signal included in said video detection signal and a sound detection signal included in said video detection signal, said trap circuit means connected between the video detection circuit and the video signal processing circuit, said trap circuit means including:

first trap means for producing a first trapped video signal by reducing an amplitude of a component level of a first signal to reduce stripe noise caused by said first signal, said first signal being one of either: said radio detection signal or said sound detection signal included in and accompanied with the video detection signal, wherein frequencies of the video detection signal and said first signal have a first predetermined relation therebetween; and second trap means responsive to said first trapped video signal for producing a second trapped video signal by reducing an amplitude of a component level of a second signal to reduce stripe noise caused by said second signal, said second signal being the other signal of either: said radio detection signal or said sound detection signal included in and accompanied with the video detection signal, wherein frequencies of the video detection signal and said second signal have a second predetermined relation therebetween, thereby reducing from a displayed video signal stripe noise caused by either of said first or second signals.

9. In a television receiver apparatus including a tuner, an IF amplifier receiving a tuned signal from the tuner, a video detection circuit for detecting a video detection signal from the tuner and a video signal processing circuit, the improvement comprising:

multiple stripe noise reducing means for simultaneously reducing a plurality of noise stripes from a detected video signal, said multiple stripe noise reducing means including:

trap circuit means connected between the video detection circuit and the video signal processing circuit for trapping at least two radio detection signals included in said video detection signal, said trap circuit means including:

first trap means for producing a first trapped video signal by reducing an amplitude of a component level of a first signal, said first signal being one of said at least two radio detection signals included in said video detection signal, wherein frequencies of the video detection signal and said first signal have a first predetermined relation therebetween; and second trap means responsive to said first trapped video signal for producing a second trapped video signal by reducing an amplitude of a component level of a second signal, said second signal being the other of said at least two radio detection signals included in the video detection signal, wherein frequencies of the video detection signal and said second signal have a second predetermined relation therebetween;

thereby reducing from a displayed video signal stripe noise caused by said at least two radio detection signals included in said video detection signal.

10. A television receiver apparatus as recited in claim 9, said trap circuit means further comprising a third trap means for reducing an amplitude of a sound detection signal included in and accompanied with the video detection signal, wherein frequencies of the video detection signal and said sound detection signal have a third predetermined relation therebetween, thereby simultaneously reducing from a display of the video detection signal noise stripes generated by said sound detection signal, said one radio detection signal, and said other radio detection signal.

* * * * *